United States Patent
Szymkowicz et al.

(10) Patent No.: US 11,802,502 B1
(45) Date of Patent: Oct. 31, 2023

(54) HYDROCARBON ADSORPTION AND DESORPTION CONTROL IN VEHICLE EXHAUST SYSTEMS USING $H_2O$ TRAPS

(71) Applicant: GM GLOBAL TECHNOLOGY OPERATIONS LLC, Detroit, MI (US)

(72) Inventors: Patrick G. Szymkowicz, Shelby Township, MI (US); Mingjie Tu, Sterling Heights, MI (US); Yuntao Gu, Farmington Hills, MI (US); Calvin Thomas, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/103,084

(22) Filed: Jan. 30, 2023

(51) Int. Cl.
*F01N 3/20* (2006.01)
*F01N 3/08* (2006.01)

(52) U.S. Cl.
CPC .......... *F01N 3/206* (2013.01); *F01N 3/0835* (2013.01); *F01N 3/2013* (2013.01); *F01N 2570/12* (2013.01); *F01N 2570/22* (2013.01); *F01N 2900/1404* (2013.01); *F01N 2900/1628* (2013.01)

(58) Field of Classification Search
CPC ............. F01N 2570/12; F01N 2570/22; F01N 2900/1628
See application file for complete search history.

(56) References Cited

U.S. PATENT DOCUMENTS

| | | | | |
|---|---|---|---|---|
| 5,678,403 A | * | 10/1997 | Kanehara | F01N 3/0878 60/309 |
| 5,776,417 A | * | 7/1998 | Frost | F01N 3/0814 422/177 |
| 6,912,840 B2 | * | 7/2005 | Posselt | F01N 13/009 60/299 |
| 7,121,087 B2 | * | 10/2006 | Hotta | F01N 13/0097 60/309 |
| 2010/0101421 A1 | * | 4/2010 | Kanazawa | B01J 20/186 96/132 |
| 2010/0307141 A1 | * | 12/2010 | Wakao | F01N 3/0814 60/288 |
| 2011/0056190 A1 | * | 3/2011 | Nakata | F02D 41/025 60/297 |
| 2015/0176455 A1 | * | 6/2015 | Chandler | B01J 37/0248 60/300 |

* cited by examiner

*Primary Examiner* — Jonathan R Matthias (57) ABSTRACT

An exhaust system includes a light-off catalyst, an exhaust system component, and at least one $H_2O$ trap. The exhaust system component is upstream from the light-off catalyst and includes catalyst material, the catalyst material configured to store hydrocarbons during a period when the light-off catalyst is warming up to a light-off temperature. The at least one $H_2O$ trap is at or upstream from the exhaust system component and is configured to perform $H_2O$ adsorption and desorption to increase a length of time for the exhaust system component to reach a hydrocarbon release temperature and prevent the exhaust system component from reaching the hydrocarbon release temperature prior to the light-off catalyst reaching the light-off temperature.

20 Claims, 9 Drawing Sheets

HYDROCARBON ADSORPTION AND DESORPTION CONTROL IN VEHICLE EXHAUST SYSTEMS USING $H_2O$ TRAPS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to exhaust systems, and more particularly to trapping hydrocarbons within exhaust system components.

Catalytic converters are used in an exhaust system of an internal combustion engine (ICE) to reduce emissions. As an example, a three-way catalytic (TWC) converter reduces nitrogen oxides, carbon monoxide and hydrocarbons within an exhaust system. The TWC converter converts nitrogen oxide to nitrogen and oxygen, carbon monoxide to carbon dioxide and oxidizes unburnt hydrocarbons to produce carbon dioxide and water.

An average light off temperature at which a catalytic converter typically begins to function is approximately 200-350° C. As a result, a catalytic converter does not function or provides minimal emission reduction during a warm-up period that occurs upon a cold startup of an engine. Operating temperatures of a catalytic converter may be approximately 650-900° C. after the warm-up period. Efficiency of a catalytic converter improves with an increase in operating temperature. For the stated reasons, the quicker a catalytic converter increases to the light off temperature upon a cold start typically the better the emission reduction performance of an exhaust system.

SUMMARY

An exhaust system is disclosed and includes a light-off catalyst, an exhaust system component, and at least one $H_2O$ trap. The exhaust system component is upstream from the light-off catalyst and includes catalyst material, the catalyst material configured to store hydrocarbons during a period when the light-off catalyst is warming up to a light-off temperature. The at least one $H_2O$ trap is at or upstream from the exhaust system component and is configured to perform $H_2O$ adsorption and desorption to increase a length of time for the exhaust system component to reach a hydrocarbon release temperature and prevent the exhaust system component from reaching the hydrocarbon release temperature prior to the light-off catalyst reaching the light-off temperature.

In other features, the at least one $H_2O$ trap is implemented as part of the exhaust system component.

In other features, the at least one $H_2O$ trap is implemented on a front end of the exhaust system component.

In other features, the exhaust system further includes another light-off catalyst upstream from the at least one $H_2O$ trap. The at least one $H_2O$ trap is implemented as part of the another light-off catalyst.

In other features, the exhaust system further includes another light-off catalyst upstream from the at least one $H_2O$ trap. The at least one $H_2O$ trap is implemented on a back end of the another light-off catalyst.

In other features, the exhaust system further includes another light-off catalyst upstream from the at least one $H_2O$ trap. The at least one $H_2O$ trap is implemented between the another light-off catalyst and the exhaust system component.

In other features, the at least one $H_2O$ trap includes multiple $H_2O$ traps implemented at or upstream from the exhaust system component and configured to perform $H_2O$ adsorption and desorption to increase the length of time for the exhaust system component to reach the hydrocarbon release temperature.

In other features, a vehicle system is disclosed and includes an engine, the exhaust system and a control module. The exhaust system is configured to treat exhaust gas output from the engine. The control module is configured to control $H_2O$ output of the engine to control the amount of $H_2O$ adsorption and desorption of the $H_2O$ trap for a predetermined period of time to control heating time of the exhaust system component.

In other features, the exhaust system further includes an electric heater configured to heat the light-off catalyst. The control module is configured to power the electric heater to warm up the light-off catalyst to the light-off temperature.

In other features, the electric heater is downstream from the exhaust system component.

In other features, a vehicle system is disclosed and includes an engine, an exhaust system, and a control module. The exhaust system treats exhaust gas output from the engine. The exhaust system includes an exhaust system component, at least one $H_2O$ trap upstream from the exhaust system component, and a light-off catalyst downstream from the exhaust system component. The control module is configured to control operation of the engine to adjust an amount of $H_2O$ output from the engine to adjust an amount of $H_2O$ adsorption and desorption of the at least one $H_2O$ trap to prevent the exhaust system component from reaching a hydrocarbon release temperature prior to the light-off catalyst reaching the light-off temperature.

In other features, the at least one $H_2O$ trap includes $H_2O$ traps.

In other features, the control module is configured to: estimate an amount of $H_2O$ storage in the at least one $H_2O$ trap; determine a temperature of the exhaust system component; determine a target amount of $H_2O$ storage; and based on the estimated amount of $H_2O$ storage, the temperature of the exhaust system component, and the target among of $H_2O$ storage, control operation of the engine to adjust the amount of $H_2O$ output from the engine.

In other features, the vehicle system further includes a $H_2O$ injector connected to the exhaust system downstream from the engine and configured to inject $H_2O$ into the exhaust system upstream from the at least one $H_2O$ trap. The control module is configured to adjust an amount of at least one of $H_2O$ and aqueous solution including $H_2O$ injected from the $H_2O$ injector into the exhaust system to adjust the amount of $H_2O$ adsorption and desorption of the at least one $H_2O$ trap to prevent the exhaust system component from reaching the hydrocarbon release temperature prior to the light-off catalyst reaching the light-off temperature. The $H_2O$ injector injects into the exhaust system at least one of i) $H_2O$, ii) an aqueous solution of alcohol and $H_2O$, and iii) an aqueous solution of urea and $H_2O$.

In other features, the control module is configured to concurrently control operation of the engine and output of the $H_2O$ injector to adjust the amount of $H_2O$ adsorption and desorption of the at least one $H_2O$ trap.

In other features, the control module is configured to: estimate an amount of $H_2O$ storage in the at least one $H_2O$ trap; determine a temperature of the exhaust system component; determine a target amount of $H_2O$ storage; and based on the estimated amount of $H_2O$ storage, the temperature of the exhaust system component, and the target among of $H_2O$ storage, control operation of the engine and the $H_2O$ injector to adjust the amount of the at least one of $H_2O$ and aqueous solution including $H_2O$ introduced into the exhaust system.

In other features, the control module is configured to: determine whether the $H_2O$ injector is present; and adjust operation of the engine and the $H_2O$ injector based on presence of the $H_2O$ injector.

In other features, a vehicle system is disclosed and includes an engine, an exhaust system, a $H_2O$ injector, and a control module. The exhaust system treats exhaust gas output from the engine. The exhaust system includes an exhaust system component, at least one $H_2O$ trap upstream from the exhaust system component, and a light-off catalyst downstream from the exhaust system component. The $H_2O$ injector is connected to the exhaust system downstream from the engine and configured to inject $H_2O$ into the exhaust system upstream from the $H_2O$ trap. The control module is configured to adjust an amount of at least one of $H_2O$ and aqueous solution including $H_2O$ injected from the $H_2O$ injector into the exhaust system to adjust an amount of $H_2O$ adsorption and desorption of the at least one $H_2O$ trap to prevent the exhaust system component from reaching a hydrocarbon release temperature prior to the light-off catalyst reaching the light-off temperature.

In other features, the control module is configured to: estimate an amount of $H_2O$ storage in the at least one $H_2O$ trap; determine a temperature of the exhaust system component; determine a target amount of $H_2O$ storage; and based on the estimated amount of $H_2O$ storage, the temperature of the exhaust system component, and the target among of $H_2O$ storage, control operation of the $H_2O$ injector to adjust the amount of the at least one of $H_2O$ and aqueous solution including $H_2O$ injected by the $H_2O$ injector into the exhaust system.

In other features, the at least one $H_2O$ trap includes $H_2O$ traps.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An exhaust system may include HC catalysts that trap hydrocarbons, exhaust heaters, TWCs, filters, particulate traps, etc. The HC catalysts may be referred to as hydrocarbon traps (HCTs) that store HCs. Depending on the exhaust system architecture, each HCT may reach a release temperature at which the HCT releases hydrocarbons collected in the HCT. This may occur prior to one or more downstream TWCs reaching a HC light-off temperature at which the TWCs begin to function and provide emission reduction. This results in ineffective emission control. TWCs do not store HCs, but rather oxidize HCs through a chemical reaction. Most tailpipe HC emissions emanate from engine cold-start and warm-up processes because temperatures of catalytic converters (or TWCs) are below HC light-off temperatures. For example, a HCT may reach a HC release temperature (e.g., 100-120° C.) and release stored HCs before a downstream TWC reaches a HC light-off temperature (e.g., 300° C.).

The examples set forth herein include exhaust systems with $H_2O$ traps for adsorbing and desorbing $H_2O$ upstream from temperature controlled exhaust components (e.g., HCTs). The $H_2O$ traps are included to increase the amount of time it takes for the temperature controlled exhaust components to reach a HC release temperature. This includes preventing the temperature controlled exhaust components from reaching a HC release temperature prior to one or more downstream exhaust components (e.g., TWCs) reaching a light-off temperature. The disclosed examples provide additional time for the downstream exhaust components, which may be electrically heated, to reach HC light-off temperatures.

As an example, the downstream exhaust components may remain below light-off temperatures for 80-200 seconds. This maximizes the trapping of HCs during operation of an engine including during startup of the engine. After being adsorbed, $H_2O$ in a catalyst changes phase from liquid to gas, referred to as desorption. The desorption process is an endothermic (energy adsorbing) process that consumes thermal energy and lowers temperature, which aids in maintaining a constant catalyst temperature near a boiling point of $H_2O$ (or 100° C.). Heaters are included to heat up the downstream exhaust components during startup and warmup periods to decrease time for the downstream exhaust components to heat up to the HC light-off temperatures.

In some embodiments, $H_2O$ adsorption and desorption energetics are implemented to control the temperature of HCT storage materials within an aftertreatment (or exhaust) system architectures and to regulate a time-temperature history of the HCT storage materials. The $H_2O$ adsorption and desorption may be used to control the time-temperature histories of HCTs including delaying the release of adsorbed HCs until downstream TWCs have achieved an HC light-off temperature. The examples include methods for controlling HC adsorption and desorption of temperature controlled catalysts (e.g., HCTs) by controlling temperatures of the temperature controlled catalysts through $H_2O$ adsorption and desorption. Active control of amounts of $H_2O$ produced by an engine and/or injected into an aftertreatment system is provided to control an amount of $H_2O$ stored within temperature controlled catalysts, such as within washcoat and substrate layers of the HCTs, to dynamically control time-temperature histories of the HCTs. Passive and/or active cooling of exhaust gas upstream from a temperature controlled catalyst and within a temperature controlled catalyst can aid in increasing the overall effectiveness of an exhaust system and reduce energy requirements.

Figure 1:
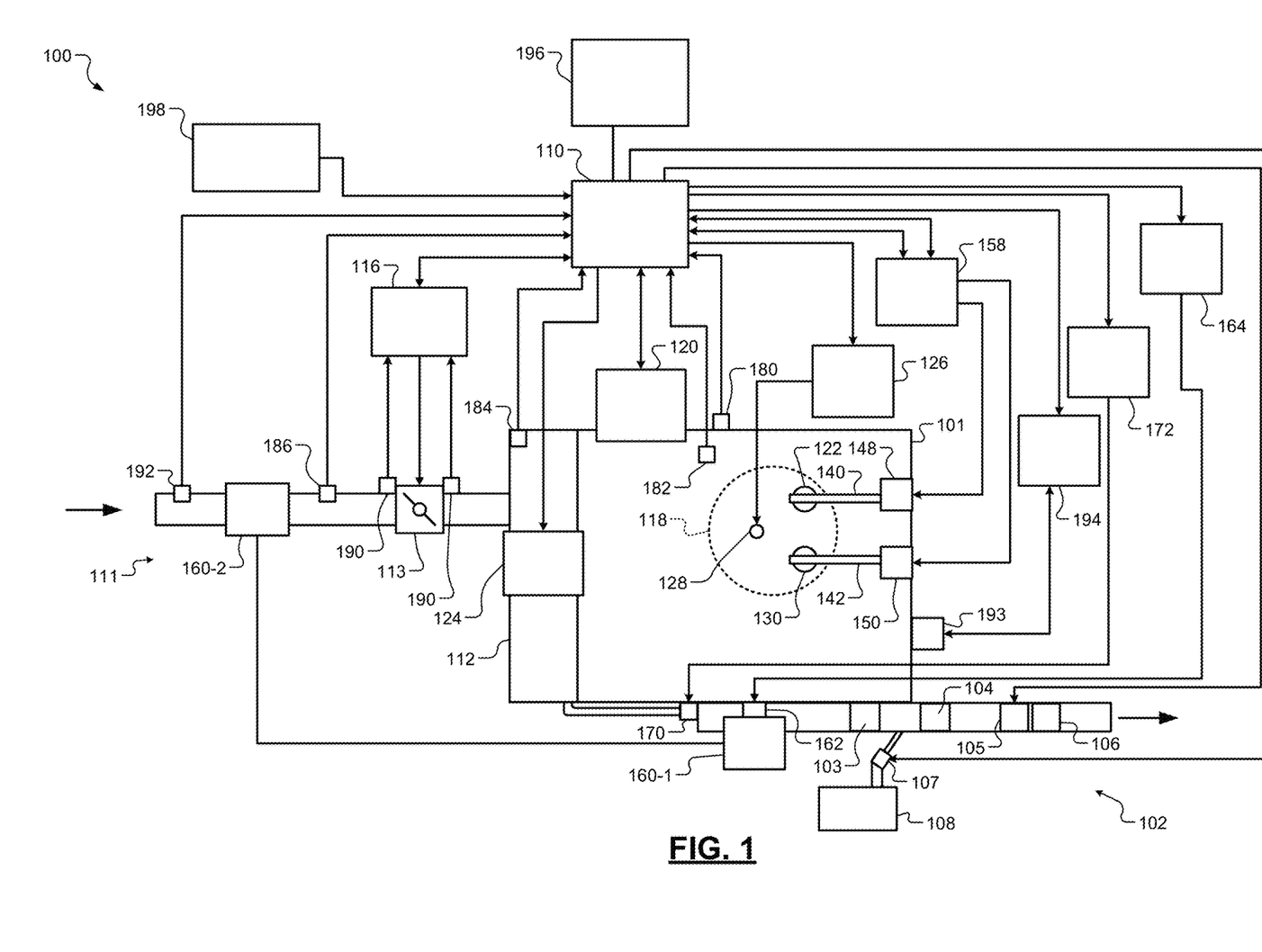
FIG. 1 is a functional block diagram of an example vehicle powertrain system including an exhaust system with one or more water ($H_2O$) traps in accordance with the present disclosure.

FIG. 1 shows a vehicle powertrain system 100 of a vehicle including an engine 101 having an aftertreatment (or exhaust) system 102. The example exhaust system 102 shown in FIG. 1 includes a first a $H_2O$ trap 103, a temperature controlled exhaust component (e.g., HCT) 104, a heater 105 and a light-off catalyst (catalyst of a TWC) 106. Although a particular number of $H_2O$ traps, light-off catalyst, and heaters are shown, any number of each may be included in the exhaust system 102. The exhaust system 102 may be configured as any of the exhaust systems disclosed and/or described herein. Each $H_2O$ trap is a $H_2O$ adsorber and desorber ($H_2O$ a/d) that extends a warm-up period of one or more downstream catalysts, such as the light-off catalyst 106. Each $H_2O$ trap may be implemented as part of a TWC, as a stand-alone component, and as part of a HCT. The $H_2O$ trap(s) may adsorb and desorb $H_2O$ output from the engine 101 and/or injected into the exhaust system 102 by an injector 107 during a startup period of the engine 101. The injector 107 may receive $H_2O$ from an $H_2O$ source 108, such as a reservoir. The injector 107 may be controlled by a control module 110. A pump may be included in or attached to the reservoir and be controlled by the control module 110 to pump a fluid to the injector 107. As another example, the $H_2O$ source may provide an aqueous solution including $H_2O$, such as a solution of alcohol and $H_2O$ or a solution of urea and $H_2O$, to the injector 107 for injection into the exhaust system 102.

To decrease the temperature ramp up rate and thus increase the overall temperature ramp up period of the temperature controlled exhaust component 104 such that the temperature controlled exhaust component 104 does not reach a HC release temperature prior to the downstream light-off catalyst 106 reaching a light-off temperature, the control module 110 controls the amount of $H_2O$ introduced into the exhaust system and adsorbed and desorbed by the $H_2O$ trap 103. This is further described below.

The vehicle may be non-autonomous, partially autonomous or fully autonomous. The engine 101 includes an intake system 111, an intake manifold 112 and a throttle valve 113. The control module 110 controls a throttle actuator module 116. The engine 101 includes one or more cylinders 118, which may be selectively deactivated by the control module 110 via a cylinder actuator module 120. The cylinder 118 has an intake valve 122. The control module 110 controls a fuel actuator module 124, which regulates fuel injection to achieve a desired air/fuel ratio.

The engine 101 may be a spark-ignition engine, in which case a spark actuator module 126 energizes a spark plug 128 in the cylinder 118 based on a signal from the control module 110, which ignites the air/fuel mixture. The engine 101 may be a homogenous charge compression ignition (HCCI) engine, which performs both compression ignition and spark ignition, or other type of engine.

The engine 101 may further have an exhaust valve 130. The intake valve 122 may be controlled by an intake camshaft 140, while the exhaust valve 130 may be controlled by an exhaust camshaft 142. The engine 101 may further include an intake cam phaser 148 and an exhaust cam phaser 150. A phaser actuator module 158 may control the intake cam phaser 148 and the exhaust cam phaser 150.

The engine 101 may include a turbocharger turbine 160-1, a turbocharger compressor 160-2 a wastegate 162, and an exhaust gas recirculation (EGR) valve 170. The EGR valve 170 may be controlled by an EGR actuator module 172. The engine 101 may further include a crankshaft position sensor 180, an engine coolant temperature (ECT) sensor 182, a manifold absolute pressure (MAP) sensor 184, a mass air flow (MAF) sensor 186, one or more throttle position sensors (TPS) 190, an intake air temperature (IAT) sensor 192 and/or one or more other sensors 198.

The control module 110 coordinates operation of the engine 101. The control module 110 may start the engine 101 via a starter motor 193. The control module 110 or another suitable module of the vehicle engages the starter motor 193 with the engine 101 for an engine startup event. The control module 110 may also start the engine 101 in response to an auto-start command during an auto-stop/start event or to an engine start command for a sailing event. A starter actuator module 194 controls the starter motor actuator and the starter motor 193 based on signals from a starter control module, as discussed further below. In various implementations, the starter motor 193 may be maintained in engagement with the engine 101.

The exhaust system 102 may include one or more close-coupled catalysts, one or more $H_2O$ traps (one $H_2O$ trap 103 is shown), and one or more downstream catalysts (one downstream catalyst 106 is shown). In an embodiment, the close-coupled catalysts and the downstream catalysts are implemented as TWCs. In an embodiment, the $H_2O$ traps are implemented i) at the close-coupled catalysts, ii) between the close-coupled catalysts and the downstream catalysts, and/or iii) at the downstream catalysts. The $H_2O$ traps may be implemented in any location along the exhaust system 102 upstream from and/or at the downstream catalysts. One or more electric heaters (one electric heater 105 is shown) may be included to heat the one or more downstream catalysts. The electric heaters decrease time for the downstream catalysts to get up to HC light-off temperatures of the downstream catalysts. The electric heaters are controlled by the control module 110. The control module 110 controls the amount of power supplied from a power source 196 to the electric heaters including the current levels and voltages of the power supplied.

The control module 110 may control operation of the engine 101, the actuator modules 116, 120, 126, 158, 164, 172, 194, the injector 107, positions of the valves 113, 170, and power supplied to the heater 105 based on information received from various sensors. This includes the sensors 180, 182, 186, 190, 192, and other sensors 198. The other sensors 198 include the other sensors referred to herein.

Figure 2:
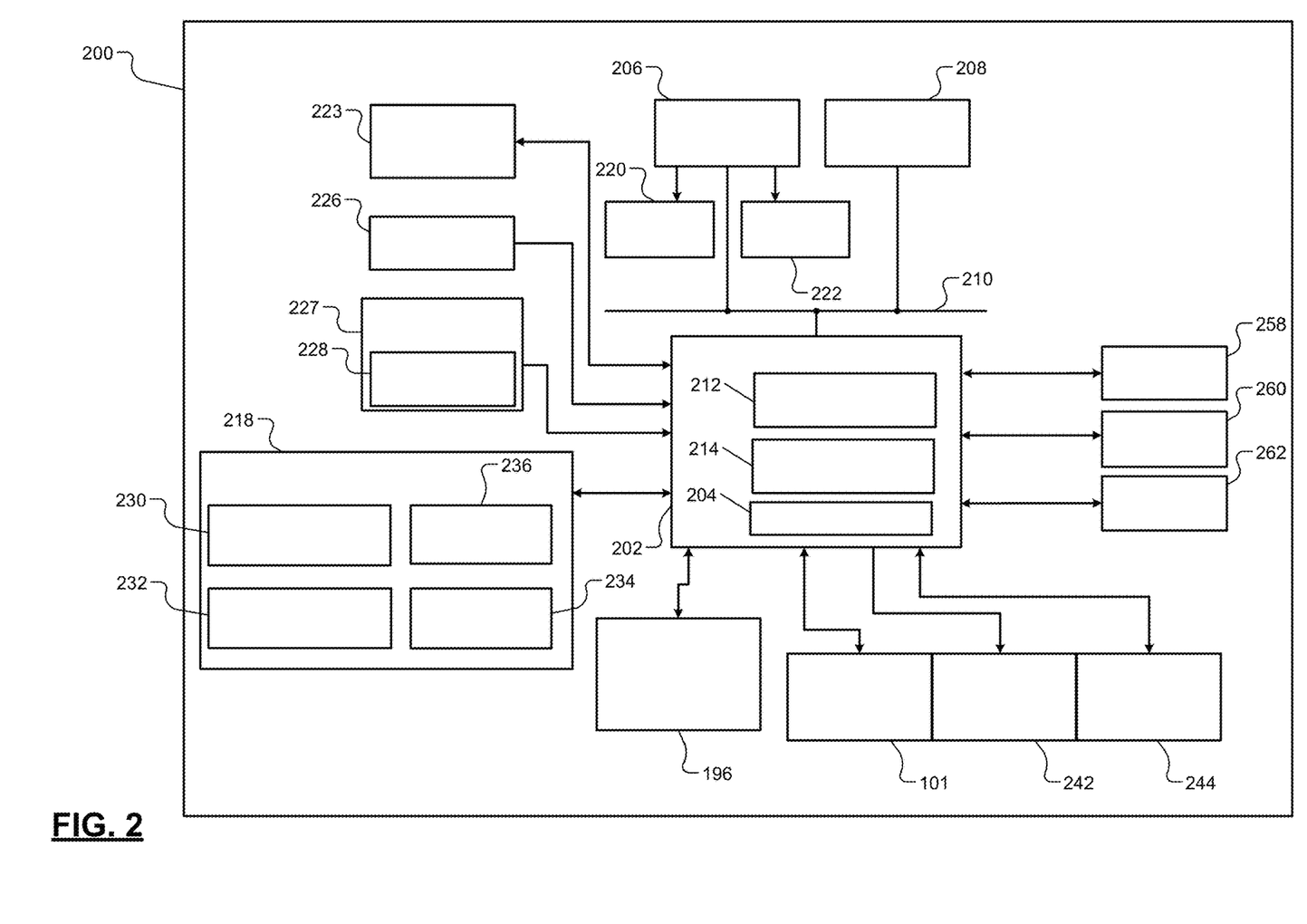
FIG. 2 is a functional block diagram of an example vehicle including an exhaust module for controlling $H_2O$ production and other parameters of an engine for hydrocarbon (HC) trapping during a startup and warm-up periods of the engine in accordance with the present disclosure.

FIG. 2 shows a vehicle 200, which may include the powertrain system 100 of FIG. 1. The vehicle 200 includes a vehicle control module 202 (e.g., the control module 110 of FIG. 1), which includes an exhaust module 204 for controlling $H_2O$ production by the engine 101 of FIG. 1, adsorption and desorption of $H_2O$ traps, parameters of exhaust system heaters, and other parameters including timing of various operations. This includes controlling engine operations and HC trapping during startup and warm-up periods of the engine 101.

The vehicle 200 may include the vehicle control module 202, an infotainment module 206 and other control modules 208. The modules 202, 204, 206, 208 may communicate with each other via one or more buses 210, such as a controller area network (CAN) bus and/or other suitable interfaces. The vehicle control module 202 may control operation of vehicles systems and include a mode selection module 212, a parameter adjustment module 214, as well as other modules. The mode selection module 212 may select a vehicle operating mode, such as a catalyst warmup mode.

The exhaust module 204 and the parameter adjustment module 214 may adjust various parameters of the vehicle 200.

The vehicle 200 may further include: a memory 218; a display 220; an audio system 222; one or more transceivers 223 including sensors 226; and a navigation system 227 including a global positioning system (GPS) receiver 228. The sensors 226 may include temperature and pressure sensors, accelerometers, a vehicle velocity and/or speed sensor, air flow sensors, $O_2$ sensors, wide range air fuel (WRAF) sensors, and/or other sensors, such as that referred to with respect to FIGS. 1 and 2. The temperature and pressure sensors may detect temperatures and pressures in various locations in the exhaust system 102 including upstream and/or downstream from each component of the exhaust system. Temperature sensors may also be included that detect temperatures of engine coolant, intake air, and transmission fluid. The GPS receiver 228 may provide vehicle velocity and/or direction (or heading) of the vehicle and/or global clock timing information.

The memory 218 may store sensor data 230 and/or exhaust system parameters 232, other parameters 234, and applications 236. The applications 236 may include applications executed by the modules 202, 204, 206, 208. Although the memory 218 and the vehicle control module 202 are shown as separate devices, the memory 218 and the vehicle control module 202 may be implemented as a single device.

The vehicle control module 202 may control operation of an engine 101, a converter/generator 242, a transmission 244, a brake system 258, electric motors 260 and/or a steering system 262 according to parameters set by the modules 202, 204, 206, 208. The vehicle control module 202 may set some of the parameters based on signals received from the sensors 226. The vehicle control module 202 may receive power from the power source 196, which may be provided to the engine 101, the converter/generator 242, the transmission 244, the brake system 258, the electric motors 260 and/or the steering system 262, etc. Some of the vehicle control operations may include enabling fuel and spark of the engine 101, starting the electric motors 260, powering any of the systems 222, 227, 258, 262, and/or performing other operations as are further described herein.

The engine 101, the converter/generator 242, the transmission 244, the brake system 258, the electric motors 260 and/or the steering system 262 may include actuators controlled by the vehicle control module 202 to, for example, adjust fuel, spark, air flow, steering wheel angle, throttle position, accelerator pedal position, etc. This control may be based on the outputs of the sensors 226, the navigation system 227, the GPS receiver 228 and the above-stated data and information stored in the memory 218.

The exhaust module 204 may determine various parameters including a vehicle speed, an engine speed, an engine output torque, a transmission PRNDL setting, a transmission gear setting, an accelerator pedal position, a throttle valve position, an accelerometer position, a brake pedal position, a clutch position, a remote start condition of the engine 101, and/or other information based on outputs from respective sensors, such as the sensors 226. The exhaust module 204 determines fuel flow levels, air flow levels, EGR flow levels, camshaft timing, spark timing, injection rates and timing, exhaust heater power timing and levels, exhaust heater current levels, exhaust heater voltage levels, $H_2O$ injection levels, $H_2O$ production levels, etc. based on the outputs of the sensors 226.

The following examples of FIGS. 3-8 are applicable to all of the above-described examples of FIGS. 1-2.

Figure 3:
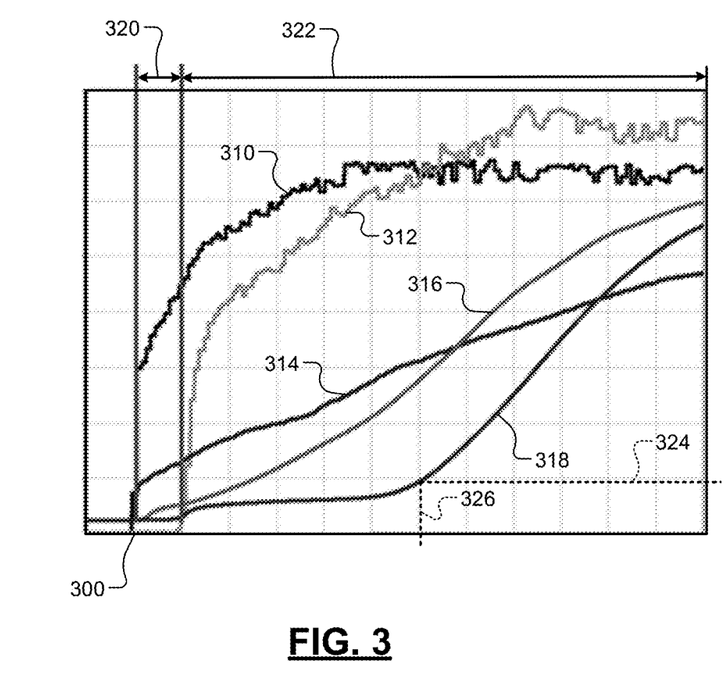
FIG. 3 is an example plot of $H_2O$ concentration and temperature versus time for different points upstream and downstream from a first catalyst and a second catalyst of an exhaust system illustrating a cooling effect of $H_2O$ adsorption and desorption in accordance with the present disclosure.

FIG. 3 shows a plot of $H_2O$ concentration measured in parts-per-million (ppm) and temperature measured in degrees Celsius (° C.) versus time for different points upstream and downstream from a first catalyst and a second catalyst of an exhaust system. This plot illustrates an example cooling effect provided by inclusion of an $H_2O$ trap that performs $H_2O$ adsorption and desorption. The example plot is for an engine having a turbo and an exhaust system with an $H_2O$ trap, an upstream catalyst and a downstream catalyst (i.e., in series with and further from the engine 101 than the upstream catalyst). The $H_2O$ trap is implemented at and/or upstream from the upstream catalyst. The downstream catalyst is located downstream from the upstream catalyst.

As an example, the engine is started, as designed by numerical designator 300. The plot includes: a first curve 310 that is indicative of concentration of $H_2O$ in the exhaust system and output from the engine; a second curve 312 that is indicative of concentration of $H_2O$ in the exhaust system and out of the upstream catalyst; a third curve 314 that is indicative of temperature of exhaust gas output from a turbo; a fourth curve 316 that is indicative of temperature of the exhaust system at an inlet of the upstream catalyst; and a fifth curve 318 that is indicative of temperature of the exhaust system at an outlet of the upstream catalyst. Period 320 is an adsorption period for the $H_2O$ trap. Period 322 is a desorption period for the $H_2O$ trap.

The outlet temperature of the upstream catalyst, as indicative of curve 318, controls the inlet temperature of the downstream catalyst. The downstream catalyst may be a light-off catalyst (e.g., a TWC). As shown, the temperature of the outlet of the upstream catalyst remains below a predetermined temperature (e.g., 100° C.), designated 324, for a predetermined period of time (e.g., 80 seconds), designated 326. The predetermined period of time is set to allow the downstream catalyst to get up to a light off temperature prior to the upstream catalyst releasing HCs. The length of the predetermined period of time may be adjusted based on how quickly the downstream catalyst is heated. As described above, one or more heaters may be used to heat the downstream catalyst. The heating period may begin prior to and/or when the engine is started. The predetermined time period may be adjusted by adjusting the amount of adsorption and desorption of the $H_2O$ trap, the makeup and dimensions of the $H_2O$ trap, and/or the number of $H_2O$ traps included between the upstream catalyst and the downstream catalyst. The difference between the curves 316, 318 is illustrative of the cooling effect provided by $H_2O$ adsorption and desorption.

Figure 4:
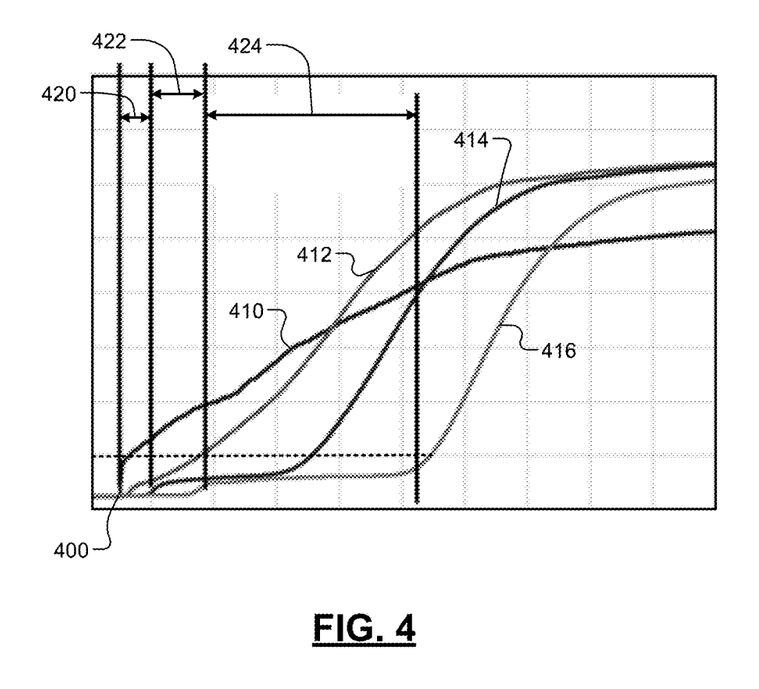
FIG. 4 is an example plot of temperature versus time for different points upstream and downstream from a first catalyst and a second catalyst of an exhaust system illustrating temperature effect due to $H_2O$ adsorption and desorption in accordance with the present disclosure.

FIG. 4 shows a plot of temperature versus time for different points upstream and downstream from a first catalyst and a second catalyst of an exhaust system illustrating temperature effect due to $H_2O$ adsorption and desorption. The more consecutive $H_2O$ traps, the longer a temperature controlled catalyst remains below a HC release temperature. In the example shown, the exhaust system includes an upstream catalyst and a downstream catalyst. Each of the catalysts are configured to perform $H_2O$ adsorption and desorption. As a result, the downstream catalyst remains below a HC release temperature longer, as compared to the example of FIG. 3, where the downstream catalyst is not to perform $H_2O$ adsorption and desorption.

As an example, the engine is started, as designed by numerical designator 400. The plot includes: a first curve 410 that is indicative of temperature of exhaust gas out of the engine and received by the exhaust system; a second curve 412 that is indicative of temperature at an inlet of the upstream catalyst; a third curve 414 that is indicative of temperature at an outlet of the upstream catalyst; and a fourth curve 416 that is indicative of temperature at an outlet of the downstream catalyst.

A first period 420 refers to an adsorption period of the upstream catalyst. A second period 422 refers to an adsorption period for both of the upstream catalyst and the downstream catalyst. A third period 424 refers to a period when temperatures of the upstream and downstream catalysts are experiencing the cooling affects due to desorption which is maintaining the upstream and downstream catalysts at temperatures below a predetermined temperature (e.g., 100° C.). Increase in $H_2O$ adsorption, increases desorption time affecting temperature of the upstream and downstream catalysts. The more catalysts and/or $H_2O$ traps performing adsorption and desorption, the longer the downstream most catalyst remains below the predetermined temperature, which is associated with HC release.

$H_2O$ traps may be located at various locations within an exhaust system based on performance and packaging considerations. The $H_2O$ traps may be located at and/or upstream from a first catalyst for which temperature is being controlled. The $H_2O$ traps are implemented to, for example, maintain the first catalyst below a HC release temperature for a predetermined period of time and/or base on a temperature and/or pressure through a light-off catalyst. The predetermined period of time may refer an amount of time for the light-off catalyst to get up to a light-off temperature and provide emission reduction.

$H_2O$ traps may be located at an output of an engine, downstream from one or more catalysts, between catalysts, implemented as part of catalysts, and/or upstream from one or more catalysts for which temperature is being controlled. $H_2O$ traps may be implemented into a back (or downstream end) of a light-off catalysts (e.g., TWC), between one or more light-off catalysts and one or more temperature-controlled catalysts, and/or integrated into a front (or upstream end) of one or more temperature-controlled catalysts. When integrated in a light-off catalyst and/or in a temperature-controlled catalyst, a $H_2O$ trap may be implemented as a zone coating layer, a washcoat layer, a substrate layer, and/or other layer. A zone coating layer, refers to a zone or portion of a catalyst that includes material configured for $H_2O$ adsorption and desorption. When located somewhere between a light-off catalyst and a temperature-controlled catalyst, a $H_2O$ trap may be: attached to a back of the light-off catalyst; attached to a front of the temperature-controlled catalyst; or a standalone catalyst packaged with a respective housing. A $H_2O$ trap may be located after (or downstream from) a front of a close coupled light-off catalyst to prevent delay in heating of the close-coupled light-off catalyst by the engine and thus prevent delay in emission reduction activity of the close-coupled light-off catalyst. A $H_2O$ trap may be located before (or upstream from) a back of a temperature-controlled catalyst to prevent excess temperature of the temperature controlled-catalyst before a downstream catalyst reaches a light-off temperature.

In the following examples, which may be implemented in the exhaust system of FIG. 1, various $H_2O$ traps, temperature-controlled catalysts, and light-off catalysts are described. The $H_2O$ trap may include $H_2O$ adsorption and desorption materials such as one or more zeolite materials, metal oxides (e.g., aluminum oxide ($Al_2O_3$), zirconium oxide ($ZrO_2$), copper oxide (CuO), and/or mixtures thereof), calcium sulfate ($CaSO_4$), porous carbon and activated carbon, and/or other suitable $H_2O$ adsorption and desorption compounds and/or elements. The zeolites may include beta (BEA), chabazite (CHA) and silicalite-1 (MFI) zeolites. The $H_2O$ storage capability of a zeolite is influenced by the silicon to aluminum (Si:Al) ratio of the zeolite.

The $H_2O$ traps may include predetermined concentrations of zeolite material to provide the adsorption and desorption characteristics for maintaining temperature of a temperature-controlled catalyst below a predetermined temperature for a predetermined period of time and/or until a light-off catalyst gets up to a light-off temperature. As an example, the $H_2O$ trap may include 0.3-0.8 centimeters-cubed per gram ($cm^3/g$) of one or more metal oxides. As another example, the $H_2O$ trap may include 0.1-1.5 $cm^3/g$ of one or more zeolites. As yet another example, the $H_2O$ trap may include 0.1 $cm^3/g$ of calcium sulfate. As yet a further example, the $H_2O$ trap may include 0.1-0.6 $cm^3/g$ of porous carbon and activated carbon. The zeolite material may be of different types and/or have different structures.

$H_2O$ trap material may be distributed within a catalyst brick differently than disclosed in the following examples. $H_2O$ trap material may be disposed within a monolith catalyst brick and/or within one or more washcoat layers depending on a predetermined amount of $H_2O$ adsorption and one or more other functionalities, such as serving as a catalyst support material, an oxidation catalyst material, or as a hydrocarbon trap. An $H_2O$ trap may include one or more washcoat layers, which may be stacked on a substrate. The washcoat layers may have the same or different levels of $H_2O$ adsorption and desorption. $H_2O$ trap material may coat one or more portions or all of exhaust system component substrates. Pellets of the $H_2O$ trap material may coat a substrate or one or more portions thereof. The $H_2O$ trap material may be applied to a "sponge-like" material such as ceramic foam. The ceramic foam may be implemented as a substrate or disposed on the substrate. Parameters of the $H_2O$ trap material, such as thicknesses, number of layers, patterns, surface areas, etc. may be selected to provide predetermined adsorption and desorption characteristics. The surface areas refer to surface areas exposed to exhaust gas and able to interact with the exhaust gas.

The temperature-controlled catalysts may be formed of and/or include zeolite material. Although the temperature-controlled catalysts and the $H_2O$ traps may be formed of zeolite material, the $H_2O$ traps are configured differently to have different compositions of zeolite material to exhibit $H_2O$ adsorption and desorption characteristics as described herein. The temperature-controlled catalysts are configured for HC trapping at low temperatures. A zeolite may include silicon, aluminum, and oxygen. A general formula for a zeolite is $M_{1/n}{}^{n+}(AlO_2)^-(SiO_2)_x \cdot yH_2O$. Materials with high $H_2O$ adsorption capacity tend to be stable and well-characterized. The $H_2O$ traps do not require inclusion of platinum, palladium, and/or rhodium. The temperature-controlled catalysts may store HCs, $H_2O$, nitrogen oxides (NOx), and/or other compounds and/or elements. The light-off catalysts may be formed of and/or include platinum, palladium, and/or rhodium.

Figure 5:
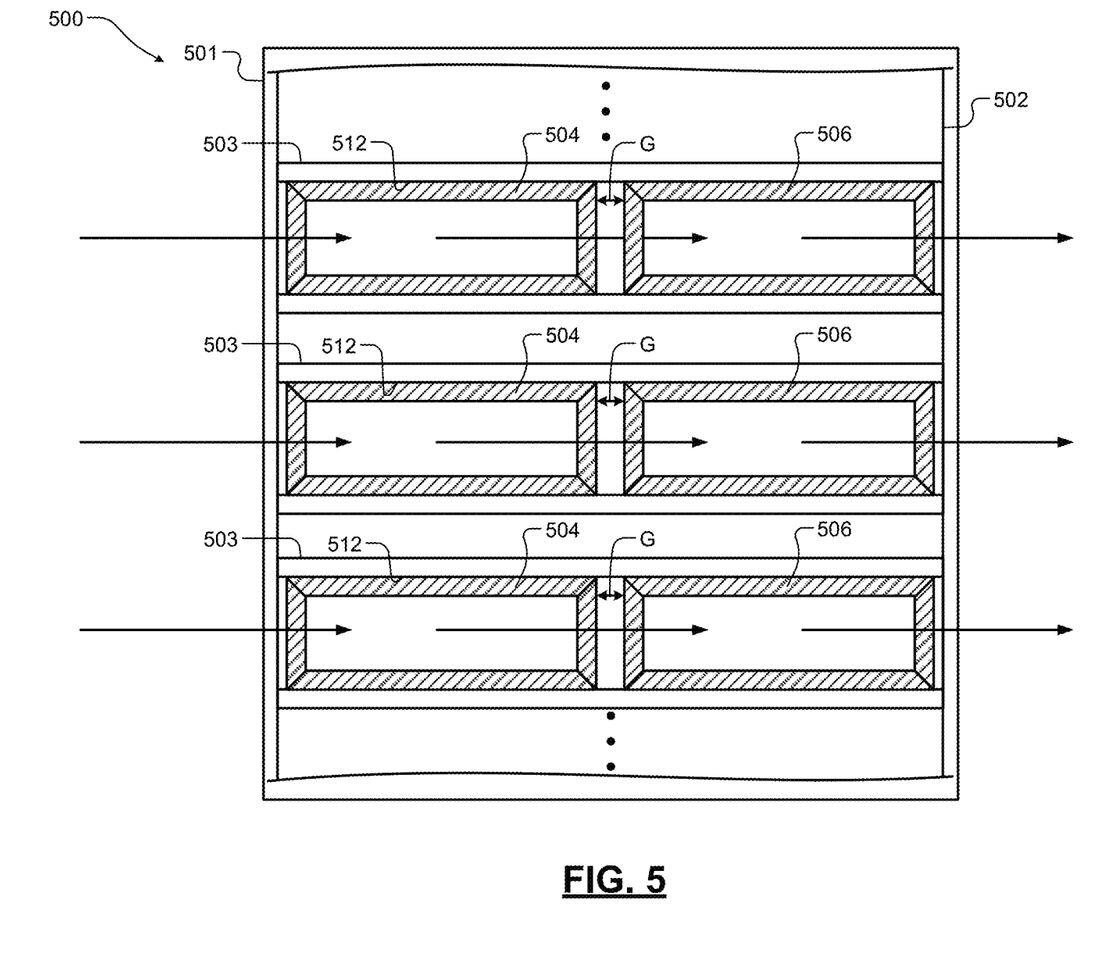
FIG. 5 is a side cross-sectional view of an example portion of an exhaust system component including a catalyst substrate with multiple washcoat layers in a consecutive arrangement in accordance with the present disclosure.

FIG. 5 shows an example portion 500 of an exhaust system component. The exhaust system component includes a housing 501 and a catalyst substrate 502. The catalyst substrate 502 is in the form of a monolith including numerous parallel channels (a few example channels 503 are shown). Multiple zonal washcoat layers 504, 506 are in a consecutive arrangement within the channels 503 and disposed on inner walls (e.g., inner walls 512 are shown) of the channels 503. The washcoat layers 504, 506 are applied to inner sides of the channels of the catalyst substrate 502. The washcoat layers 504, 506 are associated with different zones of the exhaust system component 500. Gaps G may exist between the washcoat layers 504, 506.

As a first example, the first washcoat layer 504 may be a light-off catalyst (e.g., TWC) and the second washcoat layer 506 may be a $H_2O$ trap. As another example, the first washcoat layer 504 may be a $H_2O$ trap and the second washcoat layer 506 may be a temperature-controlled catalyst (e.g., HCT). When a washcoat is implemented as a $H_2O$ trap, the material of the washcoat has high thermal stability, high surface area, high pore volume, high $H_2O$ storage capacity, and/or a predetermined $H_2O$ release temperature to exhibit $H_2O$ adsorption and desorption characteristics as disclosed herein.

Figure 6:
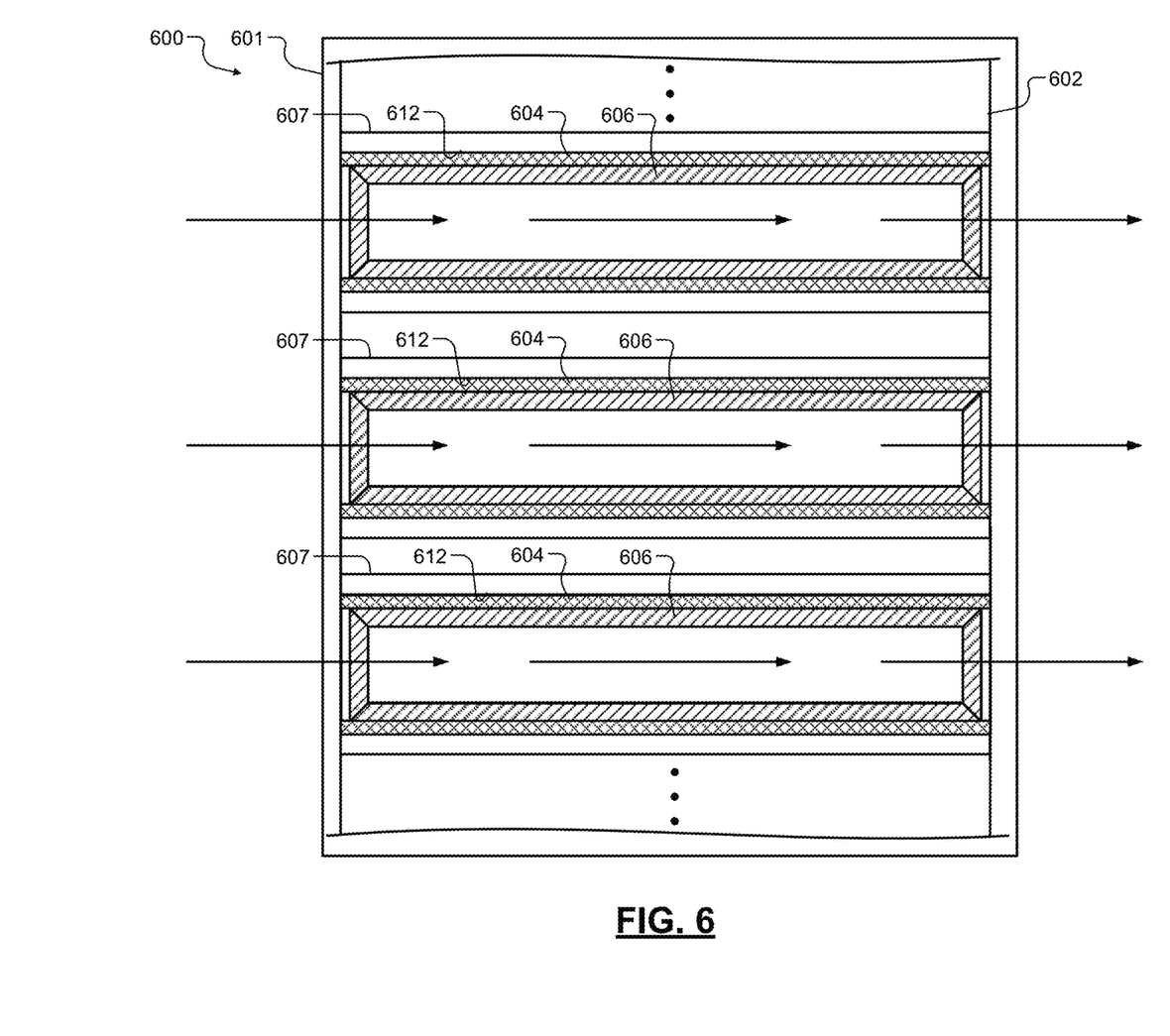
FIG. 6 is a side cross-sectional view of an example portion of an exhaust system component including a catalyst substrate with stacked washcoat layers in accordance with the present disclosure.

FIG. 6 shows an example portion 600 of an exhaust system component including a housing 601 and a catalyst substrate 602 with stacked washcoat layers 604, 606 in each of multiple channels 607. The catalyst substrate 602 is in the form of a monolith including numerous parallel channels (a few example channels 607 are shown). The stacked washcoat layers 604, 606 are disposed on inner walls of the channels (e.g., inner walls 612 are shown for the channel 607). The washcoat layers 604, 606 are stacked and applied to inner sides of the channels 607. The washcoat layers 604, 606 may be formed of the same or different materials.

As an example, the first washcoat layer 604 may be a light-off catalyst (e.g., TWC) and the second washcoat layer 606 may be a $H_2O$ trap. As another example, the first washcoat layer 604 may be a $H_2O$ trap and the second washcoat layer 606 may be a temperature-controlled catalyst or a light-off catalyst. As another example, the first washcoat layer 604 may be a temperature-controlled catalyst or a light-off catalyst and the second washcoat layer 606 may be a $H_2O$ trap.

Figure 7:
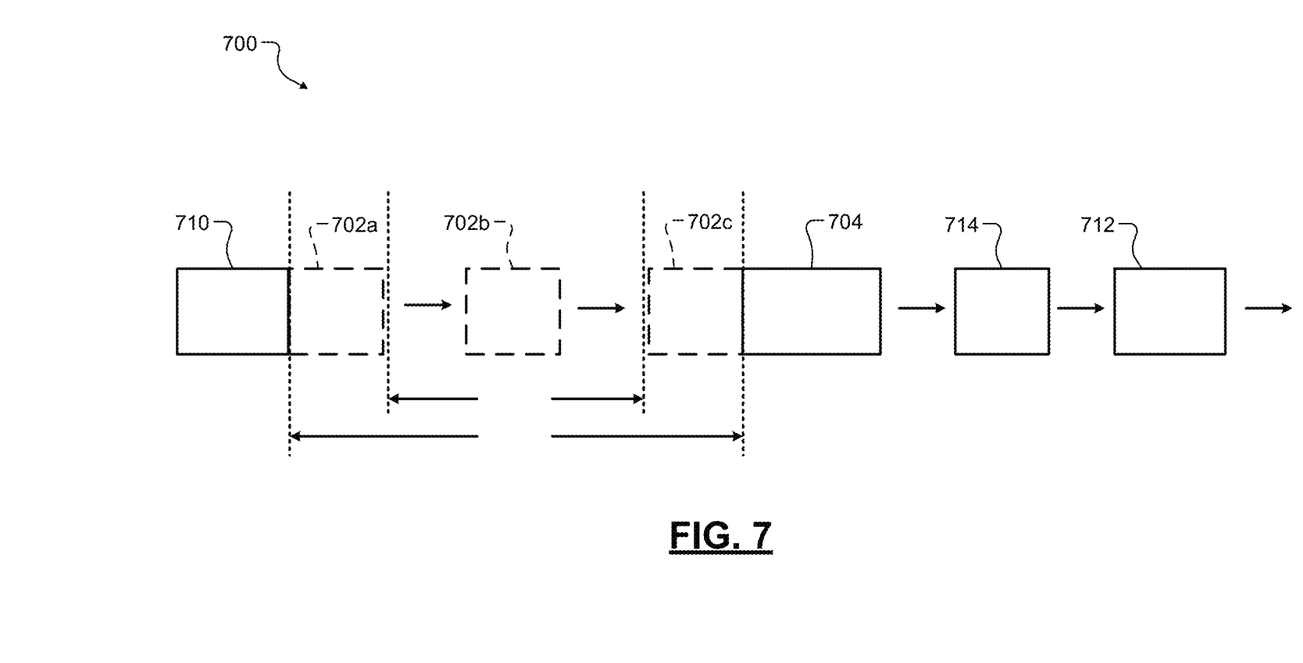
FIG. 7 is a functional block diagram of an exhaust system including a $H_2O$ trap upstream from a temperature-controlled catalyst in accordance with the present disclosure.

FIG. 7 shows an exhaust system 700 that includes a $H_2O$ trap 702 that is located upstream from a temperature-controlled catalyst 704. FIG. 7 illustrates some example locations where the $H_2O$ trap may be located. The $H_2O$ trap 702 is shown in three different locations, designated 702a, 702b, 702c. The $H_2O$ trap 702 may be located downstream from a first light-off catalyst 710. The temperature-controlled catalyst (e.g., a HCT) 712 may be located upstream from a second light-off catalyst 712. The second light-off catalyst 712 may be heated via an electric heater 714. The electric heater 714 may be located upstream from or at the second light-off catalyst 712. The electric heater 714 may include one or more electric heating elements, which may heat up exhaust gas supplied to the second light-off catalyst 712 and/or material of the second light-off catalyst 712. The one or more heating elements may be disposed on the second light-off catalyst 712 and receive current from a power source (e.g., the power source 196 of FIGS. 1-2). Location 702a is illustrative of when the $H_2O$ trap 702 is attached to a back of a light-off catalyst. Location 702b is illustrative of the $H_2O$ trap being located separately from and between the light-off catalyst 710 and the temperature-controlled catalyst 704. Location 702c is illustrative of when the $H_2O$ trap is attached to a front of a temperature-controlled catalyst.

Figure 8:
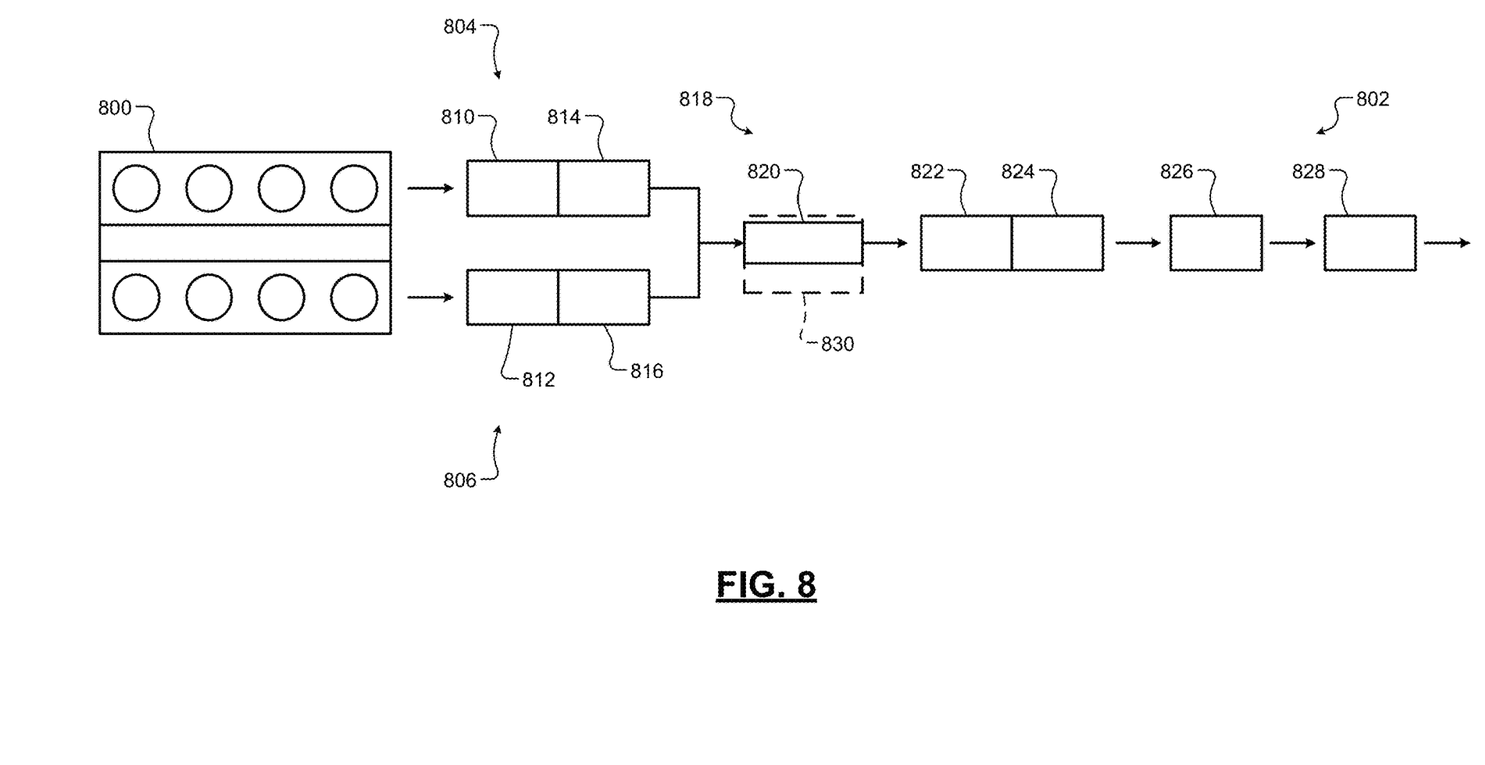
FIG. 8 is a functional block diagram of an engine and an exhaust system including multiple $H_2O$ traps in accordance with the present disclosure.

FIG. 8 shows an engine 800 and an exhaust system 802 including two exhaust gas paths 804, 806, respectively from two banks of cylinders. The exhaust gas paths 804, 806 include respective light-off catalysts (shown as TWCs) 810, 812 and respective $H_2O$ traps 814, 816. The outputs of the exhaust gas paths 804, 806 are merged together into a single exhaust gas path 818. The single exhaust gas path 818 may include one or more $H_2O$ traps (two are shown and designated 820, 822), a temperature-controlled catalyst (e.g., a HCT) 824, an electric heater 826, and a downstream light-off catalyst 828 (shown as a TWC). Any number of $H_2O$ traps may be included upstream of the HCT 824. A particulate filter (PF) 830 may be included in the exhaust system and include one of the $H_2O$ traps, such as the $H_2O$ trap 820, as shown. The $H_2O$ trap 820 may extend along a full length or a partial length of the PF 830.

The locations of the $H_2O$ traps within the exhaust system 802 aids in and is related to controlling a warmup rate of the HCT 824 and as a result delayed release of adsorbed HCs in the HCT 824 until the downstream light-off catalyst 828 has achieved a light-off temperature of the downstream light-off catalyst 828. $H_2O$ traps may be integrated as part of the light-off catalysts 810, 812 and/or as part of the HCT 824.

The exhaust system 802 is designed for $H_2O$ storage that performs $H_2O$ adsorption and desorption as described herein. $H_2O$ storage of a $H_2O$ trap is based on design of layers of $H_2O$ traps including design of washcoat and substrate layers. As used herein, the term "washcoat" may refer to a carrier for catalytic materials and disperses the catalytic materials over a large surface area. Washcoat design includes $H_2O$ storage materials, zone coating, washcoat layering, surface areas of washcoat layers, etc. Substrate design of a $H_2O$ trap includes selecting porosity levels, pore size, channel geometry, channel size, channel wall thickness, etc.

$H_2O$ storage of a $H_2O$ trap is also based on i) exhaust system design including number of catalysts in the exhaust system, number of $H_2O$ traps in the exhaust system, sizes and volumes of the catalysts and of the $H_2O$ traps, and lengths and inner and outer diameters of substrates and washcoats of the $H_2O$ traps, and ii) engine and exhaust system controls including control algorithms integrated within engine and vehicle systems to provide predetermined time-temperature profiles for temperature-controlled catalysts. This may also be based on predetermined time-temperature profiles of downstream light-off catalysts.

Figure 9:
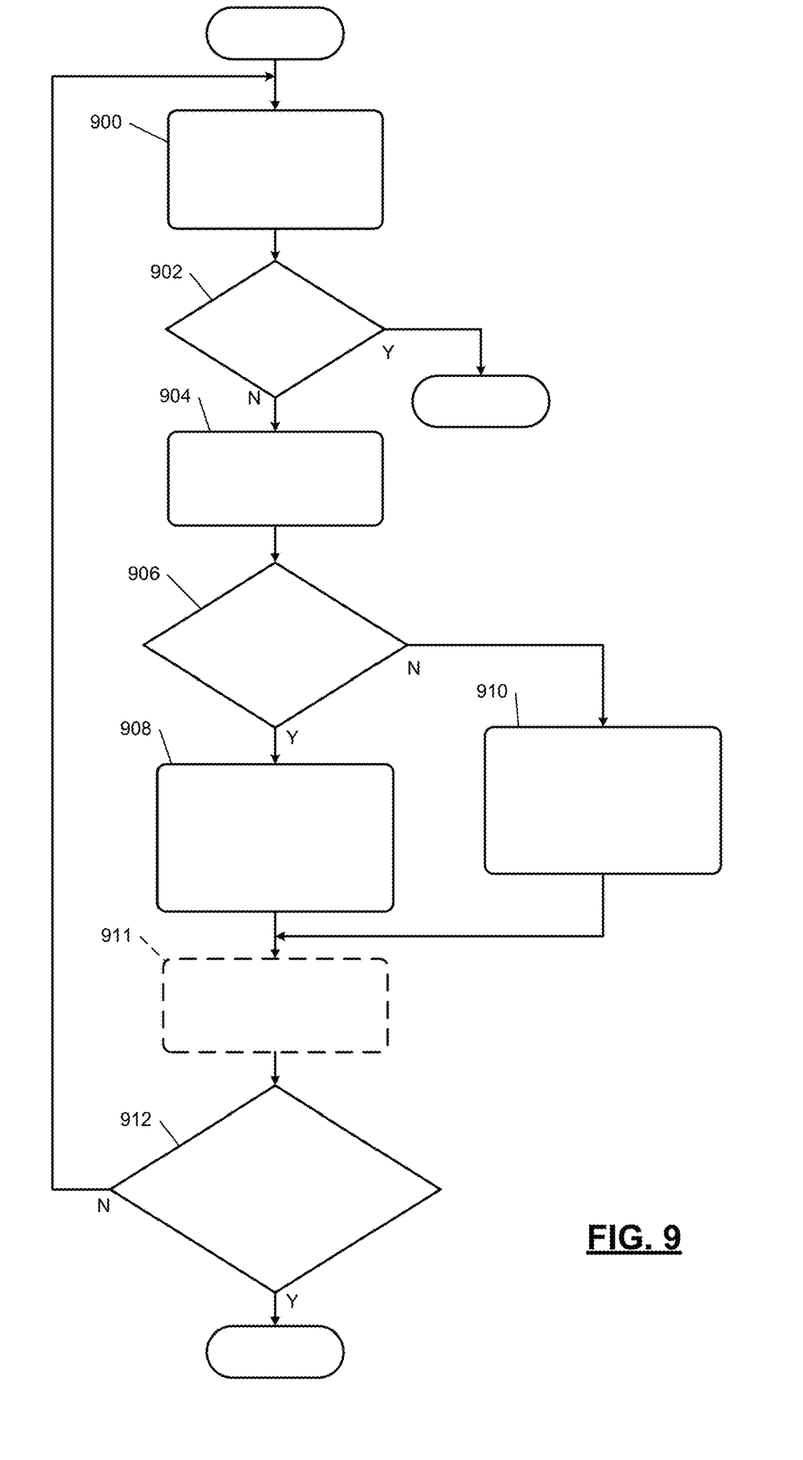
FIG. 9 illustrates an engine control method for controlling production of $H_2O$ by an engine during an engine startup period in accordance with the present disclosure.

FIG. 9 shows an engine control method for controlling production of $H_2O$ by an engine during an engine startup period. The engine control method may be implemented by the control module 110, the vehicle control module 202, and/or the exhaust module 204 of FIGS. 1-2, hereinafter referred to "the module". The following operations may be iteratively performed.

At 900, the module may estimate the amount of $H_2O$ storage and determine a temperature of one or more temperature-controlled catalysts (e.g., HCTs downstream from one or more $H_2O$ traps). The $H_2O$ storage may be estimated based on numbers and dimensions of $H_2O$ traps, amount of time since engine started, locations of $H_2O$ traps in exhaust system, makeup of the $H_2O$ traps, etc. The estimation may be determined using look-up tables, equations, exhaust system models, prestored data relating the stated known and/or determined information to the estimated amount of $H_2O$ storage, etc. The temperature(s) may be detected via temperature sensors in the corresponding exhaust system, The temperature sensors may be located at the temperature-controlled catalysts and/or elsewhere in the exhaust system.

At 902, the module, based on the estimated $H_2O$ storage, determines whether $H_2O$ storage capacity of the $H_2O$ traps has been reached. If yes, the method may end, otherwise operation 904 may be performed.

At 904, the module may determine a target amount of $H_2O$ to be stored in the $H_2O$ trap(s). At 906, the module determines whether the exhaust system includes an $H_2O$ source (e.g., the injector 107 of FIG. 1) separate from an engine. If yes, operation 908 may be performed, otherwise operation 910 may be performed.

At 908, the module may adjust operation of the engine and/or $H_2O$ output of the $H_2O$ source (e.g., the injector 107 of FIG. 1) to adjust the amount of $H_2O$ and/or an aqueous solution including $H_2O$ being introduced into the exhaust system and as a result the amount of $H_2O$ being adsorbed and desorbed by the $H_2O$ trap(s). The amount of $H_2O$ and/or amount of aqueous solution including $H_2O$ to be introduced may be determined based on the amount of $H_2O$ stored, the target amount of $H_2O$, and/or whether the $H_2O$ storage capacity of the $H_2O$ traps has been reached. This may include adjusting the air/fuel ratio, the amount of air and/or fuel injected into the engine, the speed of the engine, the load on the engine, idle time of the engine, etc. As an example, speed and load may be increased to increase $H_2O$ output. An accelerator pedal position is proportional to load, which is proportional to air flow, which is proportional to $H_2O$ output. This may also or alternatively include adjusting the flow rate, timing, injection period, etc. of the $H_2O$ source (e.g., the injector 107 of FIG. 1). At 910, the module adjusts operation of the engine to adjust the amount of $H_2O$ being introduced in the exhaust system, as described above.

There are multiple techniques that may be used to adjust the amount of $H_2O$ in an exhaust system. The amount of $H_2O$ produced by combustion of a hydrocarbon fuel may be controlled. The amount of $H_2O$ directly injected into an exhaust stream prior to a $H_2O$ trap may be adjusted. As another example, a solution containing $H_2O$ may be introduced into the exhaust system. For example, an alcohol and $H_2O$ solution, a urea and $H_2O$ solution, or other suitable aqueous solution may be introduced into the exhaust system prior to a $H_2O$ trap. Measurement signal-based control systems, model-based control systems, and combinations thereof may be implemented to control the amount of $H_2O$ introduced into the exhaust system. This may be performed to control an amount of adsorption and desorption by washcoats and substrates of $H_2O$ traps. Such control is implemented to regulate and provide a target time-temperature history of temperature-controlled catalysts.

When adjusting the operation of the engine and output of the $H_2O$ source to adjust the amount of $H_2O$ output by the engine, various parameters may be monitored and/or adjusted. Temperatures of various exhaust locations, engine coolant, intake air, and transmission fluid may be monitored. Air flow rates of the exhaust system may be monitored by $O_2$ sensors and/or WRAF sensors. Engine and transmission parameters such as engine speed, accelerator pedal position, output torque, fuel flow, air flow, EGR flow, camshaft timing, spark timing, injection strategy and timing, and transmission gear may be monitored and/or adjusted. States of the corresponding vehicle, such as PRNDL state, clutch position, vehicle speed, and remote start condition may be monitored. Model based parameters may also be determined, monitored, and/or adjusted. The model based parameters include: a predicted amount of adsorbed $H_2O$; a target amount of $H_2O$ storage; a deficit amount of $H_2O$; a selected $H_2O$ source (e.g., engine exhaust gas, external $H_2O$ source (e.g., injector separate from engine), or engine exhaust gas and external $H_2O$ source); predicted $H_2O$ adsorption rate; predicted $H_2O$ desorption rate; and time-temperature histories of predicted exhaust gas and temperature-controlled catalysts (e.g., HCTs).

At 911, the module may determine the temperature(s) of the temperature-controlled catalyst(s), as described above.

At 912, the module may determine whether the $H_2O$ target storage and/or the amount of time until the temperature-controlled catalyst(s) release HCs has been achieved. This may include determining whether the temperature(s) of the temperature-controlled catalyst(s) have remained below a predetermined release temperature for at least one of: i) a predetermined time from startup of the engine and/or a predetermined period of time since electrical heating of light-off catalyst started, and ii) until the downstream one or more light-off catalyst(s) have reached a light-off temperature. If the $H_2O$ target storage and/or the amount of time until the temperature-controlled catalyst(s) release HCs has not been achieved, operation 900 may be performed, otherwise the method may end.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above examples may be implemented to perform $H_2O$ adsorption and desorption to control temperature of storage materials, which are storing HCs, $H_2O$, NOx and other compounds and/or elements.

$H_2O$ storage materials may be tuned to correct levels of $H_2O$ adsorption through washcoat and substrate material usage and design, component volume, and system-level integration. $H_2O$ storage materials may be integrated into aftertreatment system components for temperature control purposes. The $H_2O$ storage materials may be integrated into TWCs, HCTs, particulate filters, etc. $H_2O$ storage materials may be implemented as standalone aftertreatment components.

Temperature control based on $H_2O$ evaporation prevents the release of HCs from temperature-controlled catalysts (e.g., HCTs) before downstream HC catalysts (e.g., TWCs) achieve light-off temperatures. Sufficient conversion of HCs allows for greater flexibility in other aftertreatment controls to attain target non-methane organic gases (NMOG) and NOx emissions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An exhaust system comprising:
   a light-off catalyst;
   an exhaust system component upstream from the light-off catalyst and comprising catalyst material, the catalyst material configured to store hydrocarbons during a period when the light-off catalyst is warming up to a light-off temperature;
   at least one $H_2O$ trap at or upstream from the exhaust system component and configured to perform $H_2O$ adsorption and desorption to increase a length of time for the exhaust system component to reach a hydrocarbon release temperature and prevent the exhaust system component from reaching the hydrocarbon release temperature prior to the light-off catalyst reaching the light-off temperature;
   an injector configured to inject at least one of $H_2O$ and an aqueous solution including $H_2O$ into the exhaust system upstream from the at least one $H_2O$ trap; and
   a control module configured to adjust an amount of the at least one of $H_2O$ and the aqueous solution including $H_2O$ injected from the injector into the exhaust system to adjust an amount of $H_2O$ adsorption and desorption of the at least one $H_2O$ trap.

2. The exhaust system of claim 1, wherein the at least one $H_2O$ trap is implemented as part of the exhaust system component.

3. The exhaust system of claim 1, wherein the at least one $H_2O$ trap is implemented on a front end of the exhaust system component.

4. The exhaust system of claim 1, further comprising another light-off catalyst upstream from the at least one $H_2O$ trap,
   wherein the at least one $H_2O$ trap is implemented as part of the another light-off catalyst.

5. The exhaust system of claim 1, further comprising another light-off catalyst upstream from the at least one $H_2O$ trap,
   wherein the at least one $H_2O$ trap is implemented on a back end of the another light-off catalyst.

6. The exhaust system of claim 1, further comprising another light-off catalyst upstream from the at least one $H_2O$ trap,
   wherein the at least one $H_2O$ trap is implemented between the another light-off catalyst and the exhaust system component.

7. The exhaust system of claim 1, wherein the at least one $H_2O$ trap comprises a plurality of $H_2O$ traps implemented at or upstream from the exhaust system component and configured to perform $H_2O$ adsorption and desorption to increase the length of time for the exhaust system component to reach the hydrocarbon release temperature.

8. A vehicle system comprising:
   an engine; and
   the exhaust system of claim 1, wherein the exhaust system is configured to treat exhaust gas output from the engine, and
   wherein the control module is configured to control $H_2O$ output of the engine to control the amount of $H_2O$ adsorption and desorption of the at least one $H_2O$ trap for a predetermined period of time to control heating time of the exhaust system component.

9. The exhaust system of claim 8, further comprising an electric heater configured to heat the light-off catalyst,
   wherein the control module is configured to power the electric heater to warm up the light-off catalyst to the light-off temperature.

10. The exhaust system of claim 9, wherein the electric heater is downstream from the exhaust system component.

11. A vehicle system comprising:
    an engine;
    an exhaust system treating exhaust gas output from the engine, wherein the exhaust system comprises an exhaust system component, at least one $H_2O$ trap upstream from the exhaust system component, and a light-off catalyst downstream from the exhaust system component;
    a $H_2O$ injector configured to inject at least one of $H_2O$ and an aqueous solution including $H_2O$ into the exhaust system upstream from the at least one $H_2O$ trap; and
    a control module configured to i) control operation of the engine to adjust an amount of $H_2O$ output from the engine to adjust an amount of $H_2O$ adsorption and desorption of the at least one $H_2O$ trap to prevent the exhaust system component from reaching a hydrocarbon release temperature prior to the light-off catalyst reaching a light-off temperature, and ii) adjust the amount of the at least one of $H_2O$ and the aqueous solution including $H_2O$ injected from the $H_2O$ injector into the exhaust system.

12. The vehicle system of claim 11, wherein the at least one $H_2O$ trap comprises a plurality of $H_2O$ traps.

13. The vehicle system of claim 11, wherein the control module is configured to:
    estimate an amount of $H_2O$ storage in the at least one $H_2O$ trap;
    determine a temperature of the exhaust system component;
    determine a target amount of $H_2O$ storage; and
    based on the estimated amount of $H_2O$ storage, the temperature of the exhaust system component, and the target amount of $H_2O$ storage, control operation of the engine to adjust the amount of $H_2O$ output from the engine.

14. The vehicle system of claim 11, wherein:
    the $H_2O$ injector is connected to the exhaust system downstream from the engine,
    the control module is configured to adjust an amount of the at least one of $H_2O$ and the aqueous solution including $H_2O$ injected from the $H_2O$ injector into the exhaust system to adjust the amount of $H_2O$ adsorption and desorption of the at least one $H_2O$ trap to prevent the exhaust system component from reaching the hydrocarbon release temperature prior to the light-off catalyst reaching the light-off temperature, and
    wherein the aqueous solution includes at least one of alcohol and urea.

15. The vehicle system of claim 14, wherein the control module is configured to concurrently control operation of the engine and output of the $H_2O$ injector to adjust the amount of $H_2O$ adsorption and desorption of the at least one $H_2O$ trap.

16. The vehicle system of claim 14, wherein the control module is configured to:
    estimate an amount of $H_2O$ storage in the at least one $H_2O$ trap;
    determine a temperature of the exhaust system component;
    determine a target amount of $H_2O$ storage; and
    based on the estimated amount of $H_2O$ storage, the temperature of the exhaust system component, and the target amount of $H_2O$ storage, control operation of the engine and the $H_2O$ injector to adjust the amount of the at least one of $H_2O$ and the aqueous solution including $H_2O$ introduced into the exhaust system.

17. The vehicle system of claim 14, wherein the control module is configured to:
    determine whether the $H_2O$ injector is present; and
    adjust operation of the engine and the $H_2O$ injector based on presence of the $H_2O$ injector.

18. A vehicle system comprising:
    an engine;
    an exhaust system treating exhaust gas output from the engine, wherein the exhaust system comprises an exhaust system component, at least one $H_2O$ trap upstream from the exhaust system component, and a light-off catalyst downstream from the exhaust system component;
    a $H_2O$ injector connected to the exhaust system downstream from the engine and configured to inject $H_2O$ into the exhaust system upstream from the $H_2O$ trap; and
    a control module configured to adjust an amount of at least one of $H_2O$ and aqueous solution including $H_2O$ injected from the $H_2O$ injector into the exhaust system to adjust an amount of $H_2O$ adsorption and desorption of the at least one $H_2O$ trap to prevent the exhaust system component from reaching a hydrocarbon release temperature prior to the light-off catalyst reaching a light-off temperature.

19. The vehicle system of claim 18, wherein the control module is configured to:
    estimate an amount of $H_2O$ storage in the at least one $H_2O$ trap;
    determine a temperature of the exhaust system component;
    determine a target amount of $H_2O$ storage; and
    based on the estimated amount of $H_2O$ storage, the temperature of the exhaust system component, and the target amount of $H_2O$ storage, control operation of the $H_2O$ injector to adjust the amount of the at least one of $H_2O$ and the aqueous solution including $H_2O$ injected by the $H_2O$ injector into the exhaust system.

20. The vehicle system of claim 18, wherein the at least one $H_2O$ trap comprises a plurality of $H_2O$ traps.

* * * * *